United States Patent [19]

Smyth et al.

[11] Patent Number: 4,843,045
[45] Date of Patent: Jun. 27, 1989

[54] PROCESS OF MAKING CERAMIC COMPOSITES WITH IMPROVED THERMAL SHOCK RESISTANCE

[75] Inventors: Ronald R. Smyth, Freeport; Walter W. Henslee, Lake Jackson, both of Tex.

[73] Assignee: The Dow Chemical Company, Midland, Mich.

[21] Appl. No.: 166,291

[22] Filed: Mar. 10, 1988

Related U.S. Application Data

[63] Continuation of Ser. No. 874,322, Jun. 13, 1986, abandoned, which is a continuation of Ser. No. 643,619, Aug. 24, 1984, abandoned, which is a continuation of Ser. No. 451,122, Dec. 20, 1982, abandoned.

[51] Int. Cl.$^4$ .................. C04B 35/44; C04B 35/04
[52] U.S. Cl. ...................................... 501/120; 501/84; 501/85; 501/119; 501/126; 501/127
[58] Field of Search .................. 501/120, 84, 80, 85, 501/119, 127, 126

[56] References Cited

U.S. PATENT DOCUMENTS

| 2,775,525 | 12/1956 | Austin et al. | 501/120 X |
| 3,531,308 | 9/1970 | Bagley | 501/120 X |
| 4,400,431 | 8/1983 | Henslee et al. | 501/120 X |

FOREIGN PATENT DOCUMENTS

| 0113886 | 7/1984 | European Pat. Off. | 501/120 |
| 0517908 | 2/1940 | United Kingdom | 501/120 |

OTHER PUBLICATIONS

Materials Processing Center Report, 1987–1988, pp. 37–40.

Primary Examiner—Mark L. Bell
Assistant Examiner—Karl Group

[57] ABSTRACT

A high density, shock resistant ceramic comprising from 1 to about 4 mols of a dense spinel ceramic matrix having dispersed therein, 1.5 to 1, respectively, of a metal oxide derived from a decomposable salt of said metal and having a thermal expansion characteristic different from said dense spinel ceramic matrix and at the decomposition temperature a volume less than that exhibited by its salt form and a process for preparing same.

1 Claim, 2 Drawing Sheets

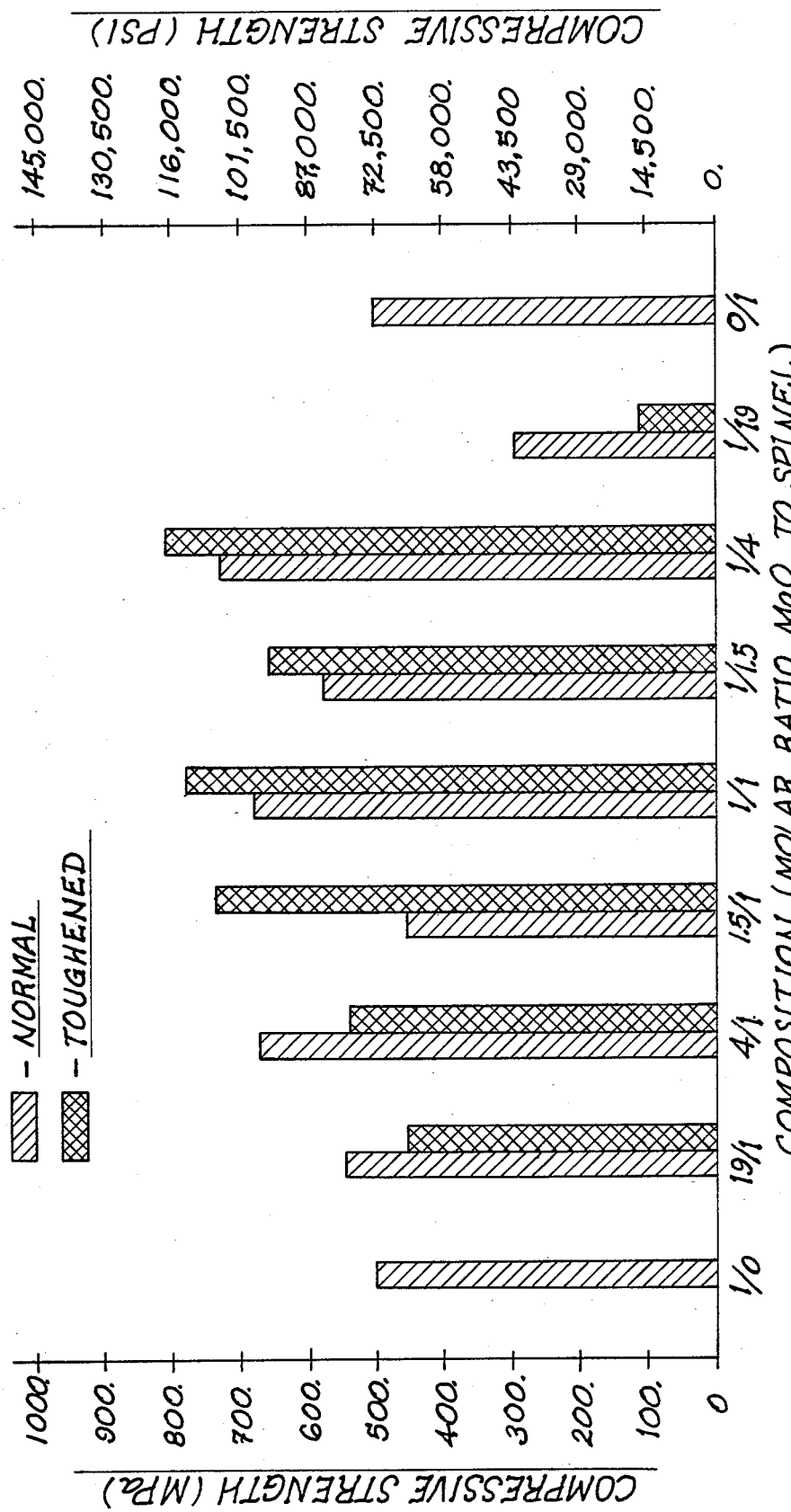

PROCESS OF MAKING CERAMIC COMPOSITES WITH IMPROVED THERMAL SHOCK RESISTANCE

CROSS-REFERENCE TO RELATED APPLICATION

This application is related to our earlier filed Application Ser. No. 874,322, filed June 13, 1986 which is a continuation in part of application Ser. No. 643,619, filed Aug. 24, 1984, which is a continuation in part of our parent application Ser. No. 451,122, filed Dec. 20, 1982, each now abandoned.

BACKGROUND AND PRIOR ART OF THE INVENTION

Ceramic materials have been made and used for thousands of years. More recently, industrial processes have demanded higher performance materials for increased temperature, thermal efficiency, operating life times and more chemically corrosive environments. These demands have often been met by materials of higher density (to reduce chemical permeation) and purity (to eliminate low melting phases). While this has generally been successful, these denser, more pure materials are more prone to damage during thermal transients due to the relative ease of crack propagation in the dense materials as compared to the less pure, less dense materials. One way to obtain acceptable ceramics of high density is by combining two materials. One such successful ceramic is a composite of magnesia (MgO) and magnesium aluminum spinel ($MgAl_2O_4$) which is fusion cast (poured into forms from the molten state.) The reduction in stress cracking is reported to be due to the gap which exists between the spinel matrix and the MgO grain, Smyth and Pollina, Refractory Oxides for MHD Heaters, HIGH TEMPERATURE SCIENCE 13, pp 189–217 (1980). The desired thermal shock and high temperature deformation resistance has not been generally available in non-fusion cast ceramics because sintering the oxide starting powders does not produce a material with the proper microstructure.

It would therefore be advantageous to have a technique and composition readily available to produce the observed effect without the difficulties inherent in fusion casting, such as the high temperatures employed, uncontrolled porosity and shape and size limitations.

BRIEF DESCRIPTION OF THE INVENTION

In accordance with the present invention it has now been found that a mixture of (1) 0.66 to 4 mols of a ceramic oxide, e.g. a single metal, bi-metal or polymetal spinel and the like having reactivity such as to densify upon heating, in the illustrative example, $MgAl_2O_4$ spinel, with (2) about 1 mol of a decomposable metal salt or mixture of decomposable metal salts, again as illustrative only, $MgCO_3$ or $Mg(OH)_2$, compatible with the ceramic oxide, e.g., the $MgAl_2O_4$, and which undergoes a reduction in volume on decomposition to its oxide from greater than the thermally expanded volume of its oxide at the use temperature and has a thermal expansion characteristic different from and preferably greater than that of the matrix (in the illustrative example $MgAl_2O_4$) as it decomposes.

Such a mixture has been found to exhibit the ability to terminate thermal stress fractures and thus permit the body to retain structural integrity. The resistance to plastic deformation at high temperature is also very good and superior to other refractory materials with similar impurity levels. It is theorized that the segregated or island phase serves as a scavenger which traps impurities and prevent them from weakening the spinel or continuous phase.

Exemplary of spinels which are believed to exhibit sufficient thermal expansion differential from the metal salts are:

| | Exemplary Spinels | |
|---|---|---|
| Single metal | Bi-metal | Polymetal |
| $Co_3O_4$ | $CoAl_2O_4$ | $Mg(Al_yCr_{2-y})O_4$ |
| | $FeAl_2O_4$ | |
| | $MgAl_2O_4$ | |
| $Fe_3O_4$ | | |
| | $NiAl_2O_4$ | |
| | $ZnAl_2O_4$ | |
| | | $Mg_xCo_{(1-x)}(Al_yCo_{2-y})O_4$ |
| | $FeCr_2O_4$ | |
| | $MgCr_2O_4$ | |
| | $ZnCr_2O_4$ | $Mg_xFe_{1-x}(Al_yFe_{2-y})O_4$ |
| | $CuFe_2O_4$ | |
| | $MnFe_2O_4$ | |
| | $ZnFe_2O_4$ | |

The ceramic aforementioned must be in a reactive state which, as used herein, is intended to mean that the matrix crystal structure is capable of undergoing densification during and/or after the thermal decomposition range of the decomposable metal salt admixed therewith.

Suitable techniques for preparing such spinels are taught in parent case U.S. patent application Ser. No. 184,189, now abandoned, filed September 4, 1980, and a continuation-in-part U.S. patent application Ser. No. 299,430, filed Sept. 4, 1981, now U.S. Pat. No. 4,400,431, both entitled, MAGNESIUM ALUMINUM SPINELS, by Walter W. Henslee, John S. Lindsey, Stanley J. Morrow, John N. Periard and Charles R. Whitworth. These spinels are produced by the co-precipitation of a metal hydroxide, chloride, carbonate and the like to produce a layered crystal which has the theoretical hypothetical structural configuration:

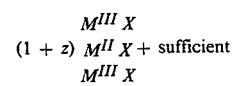

segregated $M^{III}X$ or $M^{II}X$ to provide a stoichiometric balance of $M^{II}X \cdot 2M^{III}X$ within the range of $M^{III}/M^{II}$ = 1.8 to 2.2. While the mole ratio of the previous application was 1.8 to $2.2/M^{III}$ to $M^{II}$, e.g Al to Mg, it has now been found by our co-workers that ratios of 0.7 to 2.5/1 can be prepared in a similar manner by altering the reactant ratios. The spinel structure is obtained by heating the layered crystal precipitates to 400° C. in most cases, although lesser or greater temperatures may be required to produce the oxide form of the metals of this precipitate.

Exemplary of the island or segregated phase generating salts are MgX, FeX, CoX, ZrX and the like wherein X represents carbonate, hydroxide, nitrate, chloride, acetate, carboxyhydrate, and sulfate.

The crystal structure of the products of the present invention, to be successful, may or may not contain any significant quantity of segregated phase of either metal or metals. While it may be apparent that when the decomposable metal salt is decomposed following initial mixing with the reactive ceramic structure the metal oxide of such salt can and often does interact with the ceramic crystal structures and therefore the techniques for producing the compositions of the present invention should be such as to minimize such interaction. Thus some segregated phases may be present in, for example a spinel matrix. It is also possible to produce the spinel in such a way as to guarantee the presence of an intimately mixed second phase. The inclusion of such segregated phase in the matrix may be desirable when the ultimate use does not thermally stress the matrix beyond the structural strength required for the ultimate use and when one wishes to vary the properties of the matrix phase. This is the case in Example 2 where the matrix phase is a spinel/MgO composite in about a 1/1 mole ratio with the additional MgO present as distinct inclusions in this matrix.

The techniques for forming the ceramic bodies in the present invention is generally firing or high temperature sintering of a body preformed by pressing, slip casting, tape casting, extruding or other suitable techniques, with or without additives to maintain the powder in its desired shape during sintering. The desired effect may also be obtained in unshaped or specialty refractories wherein the starting materials are formed or mixed into small spheres for ultimate use in the casting mix.

The reactive powder of the present invention may suitably be employed in any modern day ceramic body forming process with equal or better results than when such processes are employed with known ceramic materials.

IN THE DRAWINGS

The drawing represents a graphic illustration

FIG. 1 is a photograph made from an electron micrograph of a cross section of the ceramic of Example 1; and FIG. 2 is a graphic illustration of the results obtained in making a comparison between a normal spinel containing MgO as a staring material and a composition of the present invention, a spinel produced by thermal densification having a decomposable salt of magnesium, $Mg(OH)_2$, in the staring mixture, in an amount to provide the same amount of MgO in the final product as the comparative composition, the ceramic having been prepared with the decomposable salt in the starting mixture is the ceramic product of Example 5.

DETAILED DESCRIPTION OF THE INVENTION

Figure 1:
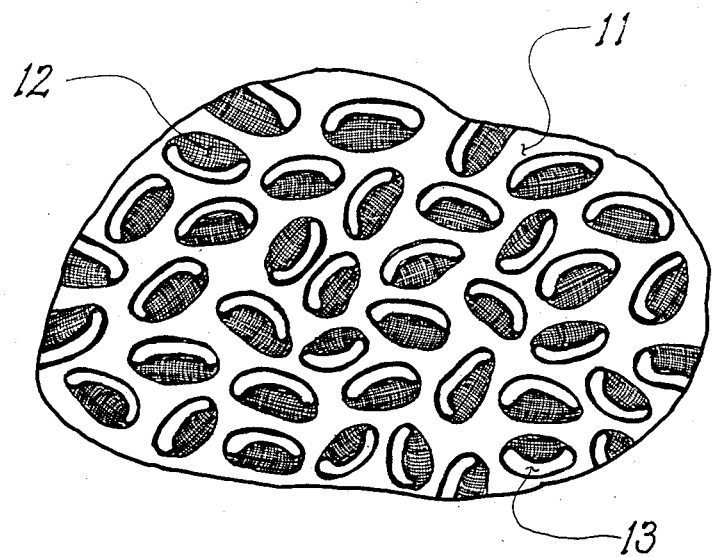

In accordance with the present invention, a ceramic composite can be prepared by mixing, either dry or in liquid media, a ceramic pulverulent material with a decomposable metallic salt pulverulent material, consolidating the mixed powder to agglomerates or to any desired shape and heating to a sufficiently high temperature to cause decomposition of the metal salt and densification of the consolidated powder. The starting materials may be from any of a number of sources. The ceramic may be of natural mineral origin, chemical precipitation or co-precipitation or other reaction, or from any thermal process including fusion forming (casting from the molten state), solid state reaction (formed below the melting temperature), oxidation of the elemental metals or any process that forms the ceramic oxide from suitable starting materials provided the ceramic is reactive, that is, capable of further densification at or about the decomposition temperature of the decomposable salt. The decomposable metal salt may be from any of a number of sources, but must yield a metal oxide with a thermal expansion coefficient greater than that of the ceramic matrix but having a volume less than the salt form. A primary requirement of the ceramic starting material is that it forms upon heating to a temperature below its solidus temperature, a consolidated body with sufficient integrity to withstand its intended use.

One such way that a spinel may be prepared is in accordance with the aforementioned co-pending application Ser. No. 299,430 now U.S. Pat. No. 4,400,431, or by co-precipitation metal compounds, that is the metal halides, sulfates, formates, hydrogen phosphate, hydroxides, acetate, nitrate, carbonate, bicarbonate and the like, or mixtures thereof including hydroxy carbonate, chlorohydroxide, the halogenated carboxy lates, in a proportion and kind to provide metal atoms of two different valences, albeit they may be the same metal or different metals, to total eight, plus or minus about 10%, positive valences available to combine with four oxygen atoms in the generic stylized formula $M_3O_4$ (or $MM'_2O_4$). The co-precipitation produces, when conducted at the pH at which co-precipitation occurs, (usually between about 9 and 9.5 for Mg/Al, and preferably washed, a product having a specific layered crystalline structure which may or may not contain a segregated magnesium hydroxide, aluminum hydroxide or oxyhydroxide phase(s). The co-precipitation is dried and calcined at between about 400° C. to about 1400° C. thereby forming the crystal lattice of the spinel structure with or without segregated phases of either metal.

Thus, for example, if a magnesium compound such as, magnesium hydroxide, or the chloride, hydroxychloride, sulfate, phosphate, acetate, nitrate, halide, carbonate, bicarbonate, and the like, is co-precipitation with an aluminum compound, such as aluminum hydroxide, or the chloride or sulfate, at a pH to co-precipitation the compounds at least one of the metals is converted to its respective hydroxide or partial hydroxide during the co-precipitation followed by washing with or without alkalinity before recovering the co-precipitation there is obtained a product having the following composition upon drying at approximately 125° C. for several hours:

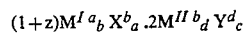

wherein each X and Y is independently selected from the aforementioned anions and at least one X and/or Y is —OH and z represents a number less than 3 and preferably about 1, and where when z is greater than 0 there will be present at least one segregated phase, as for example in the magnesium-aluminum co-precipitation an aluminum phase of $Al(OH)_3$ and/or $AlO(OH)$, and wherein "a" times the number of atoms of $M^{I(b)}$ equals the valence b of X times a, the number of atoms of X, and similarly c times the number of atoms of $M^{II(d)}$ equals the valence d of Y times c, the number of the atoms of Y, the $M^{II}/M^I$ ratio in the total co-precipitation being maintained at about 2 to 1 respectively, and having a volatile content of about 40% by weight when a Cl atom is present and about 36% by weight when all the X and Y's are —OH moieties, (analysis by thermogravimetric analysis). Individual crystallites have $M^{II}/M^I$ ratios significantly different from those previously reported, for example when $M^{II}$ is aluminum and $M^I$ is magnesium, as shown by micro-area x-ray fluorescence, electron diffraction and high resolution x-ray diffraction. The dried precipitate is thereafter calcined at between about 400° C. and 1200° C. for from typically about 4 hours to about 1 hour, respectively. The calcined precipitate has an x-ray diffraction pattern of the spinel structure, for example, $MgAl_2O_4$ with or without a segregated phase.

In accordance with the present invention the so calcined precipitate is mixed with additional decomposable metal salt to achieve the particular microstructure of the present invention. After forming into bricks or other ceramic shapes by pressing at preferably between 1000 to 10,000 psig although higher pressures may be employed and firing said shapes at above about 1200° C., preferably above 1400° C. The shape will densify uniformly to about twice its unfired density or to about 90 to >99% of the theoretically reported density for the composite at temperatures of about 1500° C.

In addition to the basic spinel, i.e. $MgAl_2O_4$, numerous mixed spinels were prepared by the technique of the previous invention. Exemplary of the mixed spinels are $ZnCo_2O_4$ and $MgAl_{2-x}Cr_xO_4$ where the sum of the product of the valence times the number of atoms equals eight. The preferred way is to add the desired metal at the co-precipitation step. However, this may not always be practical, or the hydroxides may have such a large difference in solubility that a co-precipitation with the desired composition is not formed. The second method of preparation is to mix the separately prepared compounds in the desired ratio. This requires only a knowledge of the metal content by, say, X-ray fluorescence. The mixture may be ground intimately if a homogeneous composition (e.g. one mixed phase such as $Mg^{+2}_{0.3}Co^{+2}_{0.7}Al^{+3}_{1.3}Co^{+3}_{0.7}O_4$ is desired. It is also to be recognized that when the "mixed spinels" are desired and the third metal is, or two or more additional metals are added at the co-precipitation stage the pH for co-precipitation may have to be varied, as for example when chromium is added the pH is adjusted to insure co-precipitation of all three metals in , for example, a Mg/Al/Cr system. Alternately, a dry mixture may be mixed poorly, or a gross disparity in the particle size distribution of the starting materials may be introduced, if a range of compositions is desired (e.g. $Mg^{+2}_{x}Co^{+2}_{1-x}Al^{+3}_{2-y}Co^{+3}_{y}O_4$, where x and y vary from region to region in the mass). The most preferred way to prepare a range of solid solutions within one sample is to add a range of solid solutions within one sample is to add at least one of the metals as the hard burned oxide which limits it reactivity. In general, the higher the pre-burned component has been calcined, the lower its activity will be toward solid solution formation. In some cases part of the additive metal may enter the spinel structure and part may form a separate oxide phase. In addition, a doping metal compound may be added to the pre-calcined or post-calcined spinel and may exhibit phase segregation or solid solution formation, depending on its reactivity and that of the spinel phase.

The modified spinels or composites of the present invention, in contradistinction to the previous invention, have a separate and easily identifiable segregated phase which is formed by adding a decomposable metal salt to the spinel powder before sintering, but after the spinel containing matrix itself has been produced.

In one embodiment of the present invention, magnesium hydroxide ($mg(OH)_2$) powder was mixed with calcined stoichiometric spinel powder ($MgAl_2O_4$) obtained by co-precipitation of magnesium chloride and sodium aluminate. The mixture was formed by uniaxial pressing and fired to 1500° C. to produce a dense, integral body which withstands, without catastrophic damage, repeated temperature excursions from about 1200° C. to about 25° C.

In another embodiment of the present invention magnesium hydroxide powder was mixed with calcined spinel powder containing excess MgO of the approximate composition $MgAl_2O_4.MgO$. The latter powder was obtained by co-precipitation using an excess of magnesium chloride ($MgCl_2$) with sodium aluminate over the stoichiometric ratio for spinel and subsequent calcination. To this powder was added a molar equivalent of $Mg(OH)_2$ powder and the mixture of powders were formed into a solid shape and sintered at 1500° C. to near theoretical density. Its resistance to thermal cycling was similar to that of the product in the first embodiment.

In still another embodiment of this invention powders were mixed as in the first two cases, but formed into spheres of about 1 mm. diameter. The spheres were fired to high density and used as aggregate in a refractory concrete.

In another embodiment of the present invention an additional metal is substituted partially or fully for either the magnesium and/or aluminum. For example, aqueous solutions of sodium aluminate ($Na_2Al_2O_4·3-H_2O$), magnesium chloride ($MgCl_2$), and chromium chloride ($CrCl_3$) were mixed, precipitated and the so formed precipitate filtered and washed with water, dried and calcined at about 1000° C. This powder was ground with dry magnesium hydroxide yielding a powder suitable for compression-forming into ceramic shapes, which when sintered at above about 1400° C., preferably above about 1500° C., form the thermally shock resistant micro- structure of the present invention.

EXAMPLE 1

A 1500 gram sample of magnesium aluminate spinel ($MgAl_2O_4$) powder of $-200$ mesh fineness and of purity of about 99% prepared by co-precipitation as described and calcined to 1100° C. was added to a 1000 gram sample of dried magnesium hydroxide. The resulting 2500 gram mass was placed in an intensive type Eirich Brand mixer. The rotor and pan were co-rotated at 250 rpm for 10 minutes. 150 grams of a 50/50 by weight solution of water and polyethylene glycol of 600 molecular weight was added slowly and the mixer operated for an additional 5 minutes. The resulting mixture was removed from the mixer and placed in an open pan to dry in a forced convection oven for 16 hours at 110° C.

The powder mixture was then placed into the die cavity of a forming press and vibrated to minimize entrapped air. The die dimensions are 20'cm.×15 cm. The powder filled to a height of 13.4 cm. The press was then operated with the upper ram moving down and compacting the powder at a pressure of 55 MPa for a period of 2 minutes. The resulting compact was removed from the die cavity and placed in a forced convection type drying oven and heated at progressively higher temperatures from 60° C. to 105° C. over a period of 72 hours.

The dried compacted shape was then placed in a kiln and heated to 1500° C. at a rate of 50° C. per hour. This temperature was maintained for 10 hours. The furnace was then cooled at 50° C. per hour to ambient conditions and the fired compact removed.

The resulting body has a density of 3.4 grams/ cm³ or 95% of the theoretical density of 3.58 grams/cm³. Shrinkage is 27% linear from the die (green compact to the fired body). The final weight was 1911 grams. The weight of the compacted body was 2272 grams for a mass loss of 15.9% due primarily to the conversion of $Mg(OH)_2$ to MgO. Approximately 200 g was lost while charging the die.

The fired body was found to have a transverse strength of 100 MPa and a hardness of 800 Knoop hardness number.

The resistance of the material to damage from thermal shock was also measured. A 1" cube was cut from the fired shape with a diamond coated circular blade. A furnace was preheated empty to 1200° C. The cube was set on the hearth of the furnace and the door closed. When 10 minutes had elapsed the door was opened, the cube was grasped with tongs and removed to a ceramic tile at ambient conditions and allowed to cool for ten minutes. No cracking was observed. The cube was returned to the furnace. 15 such cycles were performed with no damage that could be observed with the unaided eye.

The critical stress intensity factor ($K_{1c}$) was measured and the work of fracture (WOF) was calculated. These parameters are measures of the energy required to propagate a catastrophic crack through the material. These data compare as follows:

| Material | $K_{1c}$ | WOF |
| --- | --- | --- |
| Dense spinel | 2.0 MPa $\sqrt{m}$ | 10 J/m² |
| Composite (This invention) | 4.0 MPa $\sqrt{m}$ | 32 J/m² |
| Fusion Cast Spinel Composite | 4.4 MPa $\sqrt{m}$ | 50 J/m² |

These data indicate improvements over fine grained spinel made previously and that the composite approaches the properties of the fusion cast material.

The thermal expansion under load of this material was also measured. These tests were conducted IAW ASTM C-832-76. Using a 100 psi (0.69 MPa) load in all cases and heating to 1550° C. at 56° C./hr. The composite material continued to expand with no measurable deformation to the highest temperature attained with no sign of deformation. This behavior is similar to that shown by the fusion cast material. A stoichiometric sintered spinel body however began to deform at 1350° C.

A sample of the material was observed using electron microscopy. The spinel phase is observed to surround the magnesia phase with a "gap" between the two phases. FIG. 1 shows a drawing made from the electron micrograph.

EXAMPLE 2

A different material was substituted for the calcined spinel of example 1. This material was co-precipitation with an excess of magnesium chloride to produce upon calcination a spinel with magnesium oxide present both in solid solution with the spinel and partially as a segregated phase. This powder was mixed with magnesium hydroxide in the same ratio as example 1 and formed into a shape and fired in the same manner as in Example 1. Similar results were obtained.

EXAMPLE 3

Magnesium carbonate was used in place of magnesium hydroxide as in Example 1. A similar result was obtained.

EXAMPLE 4

A magnesia alumina chromia spinel ($MgAl_{2-x}Cr_xO_4$) powder was mixed with magnesium hydroxide in the manner described by example 1. The resulting pressing and fired body had properties similar to those of the first example.

EXAMPLE 5

A series of runs were made to determine the extent of the improvement and the range of decomposable salt added to achieve such improvement over compositions containing MgO added as MgO.

Pellets were pressed from nine different compositions of the prior art and nine different compositions according to the present invention. The prior art compositions were comprised of a spinel to which MgO was added and the powder pressed into pellets and their compressive strength measured on a hydraulic testing machine. The spinel was derived from a co-precipitated $MgCl_2$ and $NaAlO_2$, such as to provide a Mg to Al ratio of 1 to 2, respectively, dried and calcined at 1100° C., in the manner of U.S. Pat. No. 4,400,431. After pressing the pellets, they were sintered at 1600° C. for four hours, cooled and then subjected to the compression test. Nine compositions made in accordance with the present invention, employing a spinel made in the identical manner as with used in the prior art compositions, were prepared by mixing with the spinel $Mg(OH)_2$ in an amount to provide identical ratios of MgO in the sintered product as those obtained in the prior art product. The results of such experimentation and testing is set forth in the drawing, the cross-hatched bars representing the results obtained by adding MgO to the spinel in the manner of the prior art, and the solid bars representing the results obtained by adding the decomposable salt in an amount to provide the same ratio of MgO to spinel in the sintered product.

The data from which the drawing was constructed is set forth below:

| NORMAL CERAMIC COMPOSITE SPINEL/MgO | | | |
| --- | --- | --- | --- |
| Mol MgO/ mol spinel | weight % MgO | Strength MPa | psi |
| 1/0 | 100 | 500 | 72500 |
| 19/1 | 84.03 | 539 | 78159 |
| 4/1 | 46.95 | 672 | 97511 |
| 1.5/1 | 29.67 | 452 | 65604 |
| 1/1 | 21.97 | 675 | 97919 |
| 1/1.5 | 15.79 | 574 | 83368 |
| 1/4 | 6.57 | 724 | 105051 |
| 1/19 | 1.46 | 296 | 43014 |
| 0/1 | 0 | 500 | 72500 |

| TOUGHENED CERAMIC COMPOSITE SPINEL/SALT | | | |
| --- | --- | --- | --- |
| | weight % $Mg(OH)_2$ to achieve same wt. % MgO in final product as above | | |
| 1/0 | — | — | — |
| 19/1 | 88.50 | 449 | 65159 |
| 4/1 | 62.11 | 532 | 77203 |
| 1.5/1 | 38.02 | 452 | 106360 |

-continued

| | | | |
|---|---|---|---|
| 1/1 | 28.99 | 776 | 112618 |
| 1/1.5 | 21.41 | 657 | 95417 |
| 1/4 | 9.27 | 806 | 116979 |
| 1/19 | 2.10 | 106 | 15500 |
| 0/1 | — | — | — |

Thus, it is seen that improvement in compressive strength is obtained when the compositions contain 1.5 mols of decomposable salt per mol of spinel through 1 mol of decomposable salt per 4 mols of spinel. Of course the weight ratios of salt to provide the desired MgO mol ratio will vary according to the salt. It is to be noted that compressive strength is a measure of the ability of the body to maintain its integrity under compressive stress. The compositions of the present invention illustrated in the foregoing examples exemplify the improvement in thermal shock properties and compressive strength over conventional fine grain homogeneous compositions without using fusion casting techniques.

We claim:

1. A process for preparing an improved thermal shock resistant and compressive deformation resistant ceramic material comprising mixing
   (1) 1 to 4 mol of a reactive densifiable oxide ceramic matrix which is densifiable at between about 1000° and 1750° C. selected from the group consisting of mono and polymetal spinels with
   (2) 1.5 to 1 mol, respectively of a metal salt of one or more metal oxides, said salt having
      (a) a thermal expansion characteristic different from said matrix; and
      (b) a volume as the oxide less than that of its decomposable salt form; and, being a metal oxide which does not melt at the matrix densification temperature;
   said decomposable salt being present in an amount to provide a quantity of oxide after decomposition in excess of that which goes into solid solution in the matrix,
   forming a shape from said mixture,
   heating said shape to a temperature sufficient to cause the metal salt to decompose and the mixture to density yielding a microstructure, comprised of the oxide matrix (1) surrounding the metal oxide produced from said salt (2) as discrete islands within the matrix.

* * * * *

UNITED STATES PATENT AND TRADEMARK OFFICE
CERTIFICATE OF CORRECTION

PATENT NO. : 4,843,045

DATED : June 27, 1989

INVENTOR(S) : Ronald R. Smyth, Walter W. Henslee

It is certified that error appears in the above-identified patent and that said Letters Patent is hereby corrected as shown below:

Column 5, line 48 & 49, delete redundant phrase "a range of solid solution within one sample is to add"

Column 5, line 67, change "(mg(OH)$_2$)" to read -- (Mg(OH)$_2$) --

Column 8, line 12, change "pressing" to read --pressed--.

Signed and Sealed this

Fourteenth Day of January, 1992

Attest:

HARRY F. MANBECK, JR.

*Attesting Officer*     *Commissioner of Patents and Trademarks*